US007860982B2

(12) United States Patent  
Finkelstein et al.

(10) Patent No.: US 7,860,982 B2
(45) Date of Patent: Dec. 28, 2010

(54) INTERNET CONNECTIVITY VERIFICATION (75) Inventors: Amit Finkelstein, Haifa (IL); Lior Alon, Haifa (IL); Stanislav Galpert, Haifa (IL); Michael Pechuk, Akko (IL)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/049,168

(22) Filed: Mar. 14, 2008

(65) Prior Publication Data

US 2009/0232009 A1 Sep. 17, 2009

(51) Int. Cl.
G06F 15/16 (2006.01)
G06F 11/00 (2006.01)

(52) U.S. Cl. ............... 709/227; 709/224; 709/228; 709/229; 370/248; 370/229; 370/395.2; 714/4; 714/37

(58) Field of Classification Search ............ 709/224, 709/227–229; 714/4, 37; 370/229, 248, 370/295.2
See application file for complete search history.

(56) References Cited

U.S. PATENT DOCUMENTS

| 5,796,953 | A | * | 8/1998 | Zey ..................... 709/227 |
| 6,108,789 | A | * | 8/2000 | Dancs et al. ............ 726/9 |
| 6,298,043 | B1 | | 10/2001 | Mauger et al. |
| 6,691,169 | B1 | * | 2/2004 | D'Souza ............... 709/242 |
| 6,823,479 | B1 | * | 11/2004 | McElhaney et al. ....... 714/43 |
| 7,028,084 | B1 | | 4/2006 | Horton |
| 7,289,453 | B2 | | 10/2007 | Riedel et al. |
| 7,586,842 | B2 | * | 9/2009 | McGee et al. .......... 370/218 |
| 7,620,065 | B2 | * | 11/2009 | Falardeau ............. 370/465 |
| 7,620,848 | B1 | * | 11/2009 | Tanner ................ 714/25 |
| 7,668,811 | B2 | * | 2/2010 | Janssens et al. ..... 707/999.003 |
| 7,746,796 | B2 | * | 6/2010 | Swallow et al. ......... 370/249 |
| 2001/0052007 | A1 | * | 12/2001 | Shigezumi ............. 709/223 |
| 2003/0055962 | A1 | * | 3/2003 | Freund et al. .......... 709/225 |
| 2003/0081748 | A1 | * | 5/2003 | Lipinski ............ 379/201.02 |
| 2003/0204606 | A1 | * | 10/2003 | Selgas et al. .......... 709/228 |
| 2004/0015592 | A1 | * | 1/2004 | Selgas et al. .......... 709/228 |
| 2004/0032865 | A1 | * | 2/2004 | Kwon .................. 370/367 |
| 2004/0066747 | A1 | * | 4/2004 | Jorgensen et al. ....... 370/241 |
| 2004/0208186 | A1 | * | 10/2004 | Eichen et al. ......... 370/401 |
| 2005/0022189 | A1 | | 1/2005 | Proulx et al. |
| 2005/0135392 | A1 | | 6/2005 | Burns et al. |
| 2005/0193127 | A1 | * | 9/2005 | Moore et al. ........... 709/228 |

(Continued)

OTHER PUBLICATIONS

Evaluation of architectures for QoS analysis of applications in Internet environment (12 pages) http://www.ist-intermon.org/download/ictsm10-spu-idma.pdf, submitted 2008.

(Continued)

Primary Examiner—Alina N. Boutah
(74) Attorney, Agent, or Firm—Workman Nydegger (57) ABSTRACT

Verification of Internet connectivity using multiple prior connection attempts to Internet destination(s). The Internet destinations may be destinations that have high reliability and that do not easily have intermediating systems that might deny a connection request. Such an Internet destination might be, for example, root Domain Name Server (DNS) servers. Connection attempt results are obtained by for at least some of the connection attempts, tracking which resulted in success and failure. Internet connectivity is then verified based on the collective results, rather than relying on any one single connection attempt. In one embodiment, the frequency of the connection attempts may depend on a current state of the Internet connection.

21 Claims, 5 Drawing Sheets

U.S. PATENT DOCUMENTS

| | | | |
|---|---|---|---|
| 2005/0283527 A1* | 12/2005 | Corrado et al. | 709/224 |
| 2006/0101026 A1* | 5/2006 | Fukushima | 707/100 |
| 2006/0143299 A1* | 6/2006 | Jones et al. | 709/227 |
| 2006/0182036 A1* | 8/2006 | Sasagawa et al. | 370/242 |
| 2006/0190308 A1* | 8/2006 | Janssens et al. | 705/5 |
| 2006/0230134 A1* | 10/2006 | Qian et al. | 709/224 |
| 2006/0250967 A1 | 11/2006 | Miller et al. | |
| 2006/0262772 A1 | 11/2006 | Guichard et al. | |
| 2006/0274760 A1 | 12/2006 | Loher | |
| 2007/0033197 A1* | 2/2007 | Scherzer et al. | 707/10 |
| 2007/0073873 A1* | 3/2007 | Levy et al. | 709/224 |
| 2007/0127082 A1* | 6/2007 | Bae | 358/400 |
| 2007/0177499 A1* | 8/2007 | Gavrilescu et al. | 370/229 |
| 2007/0192501 A1* | 8/2007 | Kompella | 709/230 |
| 2007/0268820 A1* | 11/2007 | McGee et al. | 370/217 |
| 2007/0280283 A1* | 12/2007 | Sorrini et al. | 370/465 |
| 2008/0008165 A1* | 1/2008 | Ikeda et al. | 370/360 |
| 2008/0033770 A1* | 2/2008 | Barth et al. | 705/5 |
| 2008/0177882 A1* | 7/2008 | Cheshire | 709/227 |
| 2008/0186847 A1* | 8/2008 | Aluru et al. | 370/231 |
| 2008/0293404 A1* | 11/2008 | Scherzer et al. | 455/426.1 |
| 2009/0003221 A1* | 1/2009 | Burns et al. | 370/241 |
| 2009/0019141 A1* | 1/2009 | Bush et al. | 709/223 |
| 2009/0080337 A1* | 3/2009 | Burns et al. | 370/248 |
| 2009/0089620 A1* | 4/2009 | Johnson et al. | 714/37 |
| 2009/0129260 A1* | 5/2009 | Qian et al. | 370/216 |

OTHER PUBLICATIONS

Flow-based analysis of Internet traffic (18 pages) http://www.heanet.ie/downloads/pam-st_1.pdf, submitted 2008.

Quantile sampling for practical delay monitoring in Internet backbone networks (16 pages) http://an.kaist.ac.kr/~sbmoon/paper/intl-journal/2007-comnet-quantile-sampling.pdf, 2007.

* cited by examiner

INTERNET CONNECTIVITY VERIFICATION

BACKGROUND

The Internet permits users access to a wealth of information and services. A user need only have a computer that is connected to the Internet in order to access much of that information and services. Accordingly, there are a variety of applications that may run on a computer that would be interested in verifying whether or not the computer is actually connected to the Internet. One application might, for example, manage Internet connections through multiple Internet Service Providers (ISPs). There are several conventional mechanisms for verifying Internet connectivity.

One conventional mechanism is referred to here as "ISP gateway testing". This mechanism makes a connection attempt to the ISP gateway, which might be a dedicated server machine, or perhaps a dedicated appliance. If, during a predefined period, there is no reply from the ISP gateway, the mechanism concludes that there is no Internet connectivity. If, on the other hand, there is a reply from the ISP gateway, the mechanism concludes that there is Internet connectivity. However, being connected to an ISP gateway does not necessarily imply Internet connectivity. Accordingly, this mechanism may result in false positive determinations of Internet connectivity.

Another conventional mechanism involves testing connections with other remote sites. In this approach, network traffic is dispatched to a configurable remote site such as, perhaps a Web site. The conclusion about Internet connectivity is made based on success or failure of a connection attempt to that remote Web site. This mechanism depends on the availability of the configured remote site. If the site is not operational or is simply too overloaded to reply, or if the connection request is blocked by an intermediary (such as a firewall or proxy server), this does not mean there is an absence of Internet connectivity. Accordingly, this approach can result in some false negative determinations regarding Internet connectivity. Furthermore, this approach requires configuration of the remote site, which might not be easy for a beginning user.

Another conventional approach uses passive testing. This approach is based on analyzing traffic that passes through a network card connected to a specific ISP. If traffic comes from Internet sources, this implies Internet connectivity through this link. However, if there is no traffic coming from Internet sources, or if all of the traffic is local, no conclusion can be drawn regarding Internet connectivity.

BRIEF SUMMARY

At least some embodiments described herein relate to verification of Internet connectivity using multiple prior connection attempts to Internet destination(s). In one embodiment, the Internet destinations are destinations that have high reliability and that do not easily have intermediating systems that might deny a connection request. Such an Internet destination might be, for example, root Domain Name Server (DNS) servers. Connection attempt results are obtained by for at least some of the connection attempts, tracking which resulted in success and failure. Internet connectivity is then verified based on the collective results, rather than relying on any one single connection attempt. In one embodiment, the frequency of the connection attempts may depend on a current state of the Internet connection.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, Internet connectivity is verified using multiple prior connection attempts to Internet destination(s). In one embodiment, the Internet destinations are destinations that have high reliability and that do not easily have intermediating systems that might deny a connection request. Such an Internet destination might be, for example, root Domain Name Server (DNS) servers. Connection attempt results are obtained by (for at least some of the connection attempts) tracking which resulted in success and failure. Internet connectivity is then verified based on the collective results, rather than relying on any one single connection attempt. The frequency of the connection attempts may be adaptive and depend on the current state of the Internet connection.

First, some introductory discussion regarding a computing system that is connected to the Internet will be described with respect to FIG. 1. Then, various embodiments of the Internet connection verification mechanism will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
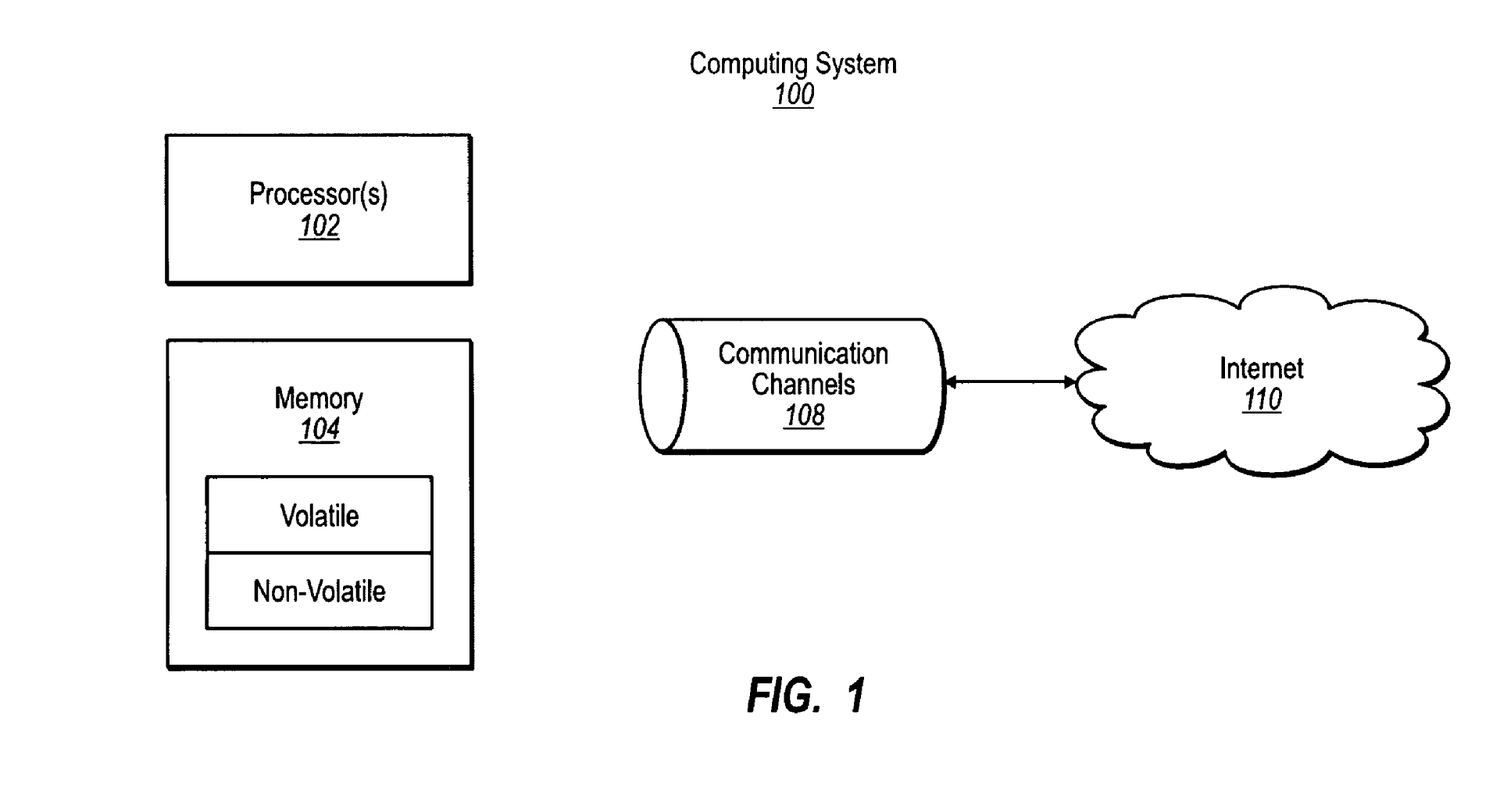
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that as allow the computing system 100 to communicate with other message processors over, for example, the Internet 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
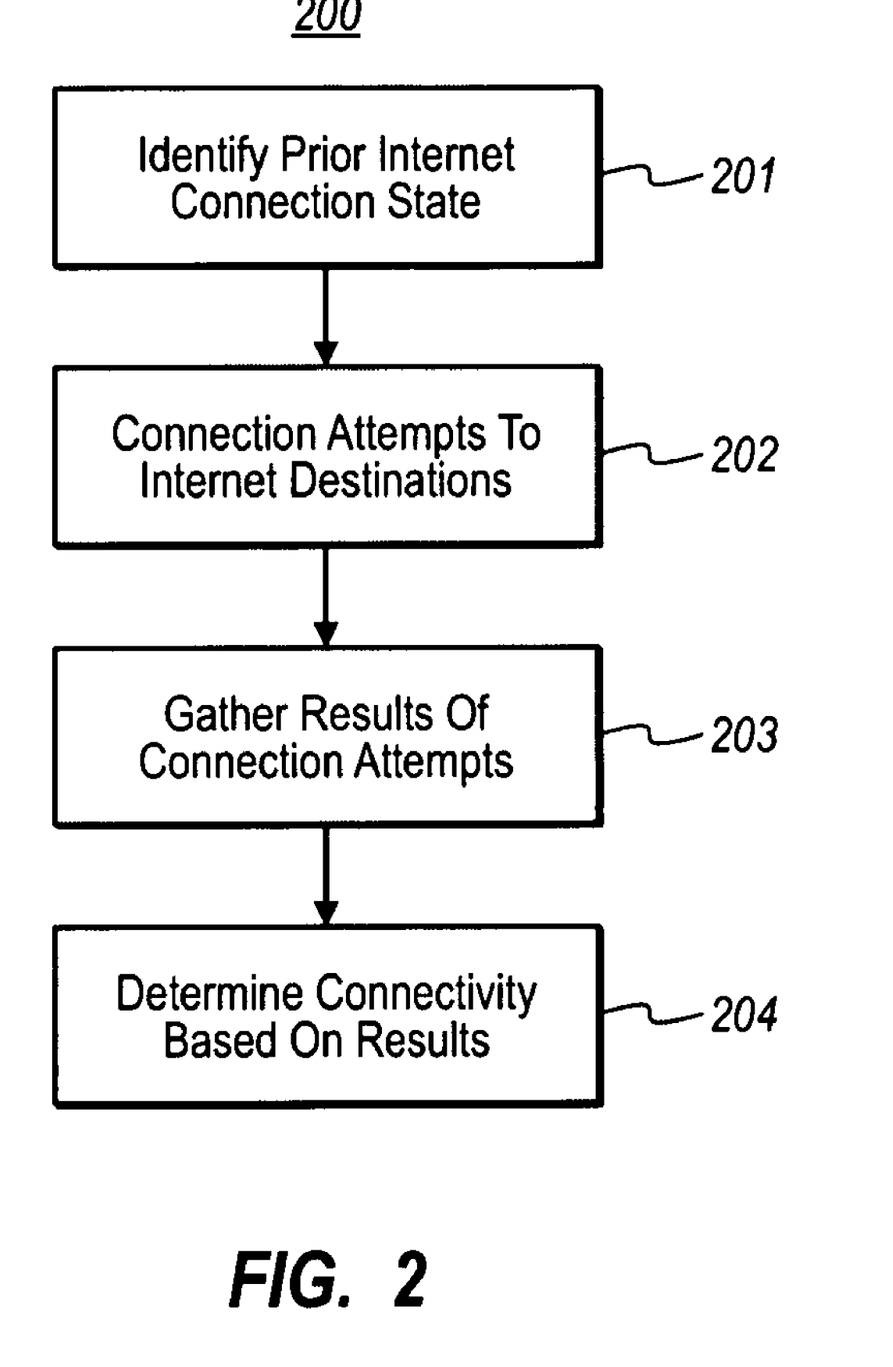
FIG. 2 illustrates a flowchart of a method for verifying Internet connectivity using multiple connection attempts.

FIG. 2 illustrates a flowchart of a method 200 for verifying whether or not a computing system is connected to the Internet. The computing system may be, for example, the computing system 100 of FIG. 1. One or more applications running on the computing system may have interest as to whether or not the computing system is connected to the Internet. The method 200 provides a potentially reliable way of accomplishing the Internet connectivity verification. The method 200 may be accomplished in response to computer-executable instructions being executed by the processors 102 of the computing system 100. Those computer-executable instructions may be present on one or more computer-readable media of the type described herein.

The method 200 may optionally begin by identifying a prior Internet connection state (act 201). For example, when the computing system 100 boots up, a certain Internet connection state might be presumed by default. The Internet connection state may subsequently change depending on the results of subsequent Internet connection attempts. The description will move temporarily to FIG. 3, prior to returning once again to the method 200 of FIG. 2.

Figure 3:
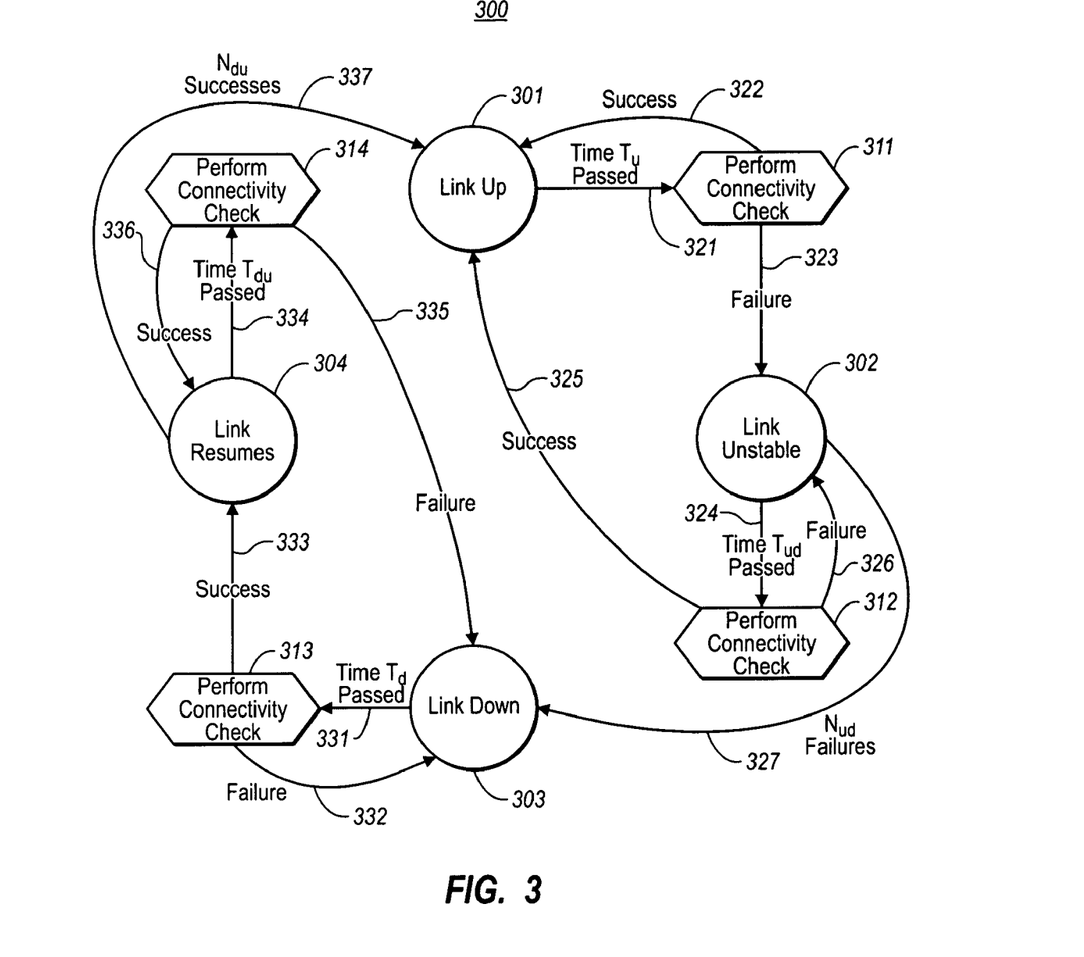
FIG. 3 illustrates an example state transition diagram for use in verifying Internet connectivity in accordance with one embodiment.

FIG. 3 illustrates a state transition diagram 300 for use in verifying as Internet connectivity in accordance with one embodiment. In this state transition diagram 300, there are four Internet connectivity states, link up state 301, link unstable state 302, link down state 303, and link resumes state 304.

A link up state 301 means an Internet connection is determined as being present as there have been no unsuccessful connection attempts in a predetermined number of prior connection attempts.

A link down state 303 means an Internet connection is determined as not being present as there have been no successful connection attempts in a predetermined number of prior connection attempts. Although not required, the predetermined number ($N_{du}$ in FIG. 3) of successful connection attempts used to determine a link up state may be the same as the predetermined number ($N_{ud}$ in FIG. 3) of unsuccessful connection attempts used to determine a link down state. In the various examples of FIG. 3, these predetermined numbers $N_{du}$ and $N_{ud}$ will be three, although the principles described herein are not limited to that number.

A link unstable state 302 means an Internet connection is still assumed to be present, but that there has been at least one unsuccessful connection attempt in the last predetermined number $N_{ud}$ of prior connection attempts. However, in the link unstable state 302, there have not yet been enough unsuccessful connection attempts to achieve the link down state 303.

A link resumes state 304 means an Internet connection is still assumed to not be present, but that there has been at least one successful connection attempt in the last predetermined number $N_{du}$ of prior connection attempts. However, in the link resumes state 304, there have not yet been enough successful connection attempts to as achieve the link up state 301.

Returning to FIG. 2, the method then periodically makes multiple consecutive connection attempts to one or more Internet destinations (act 202). In this description and in the claims, "periodically" means that the next connection attempt is made at a certain time or within a certain time frame with respect to the prior connection. The timing may not be constant however. In fact, in the embodiments described hereinafter, the connection attempts are made more frequently under some circumstances than under other circumstances. For instance, the frequency of connection attempts may depend on which of the connection states 301 through 304 the process is presently in.

There is no limit to the Internet destinations that may be attempted to be connected to using the method 200. In one embodiment, it is the same Internet destination. In other embodiments, connections attempts are sometimes made to the same Internet destination, but other connection attempts are made to yet other Internet destinations. In yet other embodiments, the connection attempts are made to different Internet destinations each time. The connection attempts may be made randomly, or perhaps round robin to a predetermined set of Internet destinations.

Examples of Internet destinations include Web sites. To improve reliability of the Internet verification mechanism, however, the Web sites may be enterprise sites that are highly reliable and have perhaps built in redundancy. Many enterprises and corporations, for example, provide Web sites that are highly redundant such that the Web site is represented using a cluster of servers. If one server goes down, another server may be relied upon to handle incoming connection attempts. Thus, if a connection attempt fails to one of these more reliable destinations, it is more likely because the computing system lacks an Internet connection, and less as likely due to inoperability of the destination itself.

One type of server that is very reliable is a root Domain Name Server (DNS) server. DNS servers provide a function that is essential to the performance of the Internet. Root DNS servers translate a particular Fully Qualified Domain Name (FQDN) that is more human readable into a corresponding Internet Protocol (IP) address, which is not as human readable and includes a series of 32 bit binary numbers for IPv4 protocol and 128 bit binary numbers for IPv6 protocol. Without root DNS servers, the Internet becomes much less functional. Accordingly, DNS server standards provide robust means whereby the availability and reliability of root DNS servers is high, and whereby it is highly unlikely that a connection attempt to a root DNS server will fail due to an intermediary (such as a firewall or proxy server). In addition, there are a number of root DNS servers. If one fails, the DNS standards provide for proper routing to get the connection attempt to another root DNS server.

In one embodiment, the root DNS servers are used as the Internet destination to which connection attempts are requested. The attempts may be made to a single root DNS server, but may also be made to all of the root DNS servers in a round-robin or random fashion.

The connection attempt results are then gathered (act 203). In one embodiment, all of the connection attempt results for the prior connection attempts are gathered, although the principles described herein will also operate if a conclusion is reached on success or failure only with regard to some of the prior connection attempts. Internet connectivity is then determined using the collective attempt results, rather than relying on any single connection attempt result (act 204).

Referring back to FIG. 3, the various state transitions of the state transition diagram 300 will now be described. Assume, for purposes of this as description, that we begin in a link up state 301, although the beginning link up state is arbitrary. In actual implementation, one might just as reasonably choose to begin in a link down state 303.

Beginning in the link up state 301, an Internet connection check (also called herein an "Internet connection attempt") will be performed every certain period of time. The symbol $T_u$ is used in FIG. 3 to represent that period of time for making connection requests if in the link up state 301. In one embodiment, the time $T_u$ is 1 minute (which equates to 60 seconds), which will be assumed for this example hereinafter in order to provide understanding that concrete numbers help provide. That said, there is no limit to the value of $T_u$, and the optimum value for $T_u$ will depend on preferences and applications.

Once 60 seconds elapses (see arrow 321) a connectivity check is performed (see block 311). If the connection attempt is successful (arrow 322), the link up state 301 is retained. If, on the other hand, the connection attempt fails (see arrow 323), the link unstable state 302 is entered. At this point, the number of consecutive unsuccessful attempts is just one. If the number of consecutive unsuccessful attempts was equal to a certain threshold (referred to as $N_{ud}$ in FIG. 3), there would be a transition 327 to the link down state 303. However, since there was only one consecutive unsuccessful connection attempt, the process remains at the link unstable state 302. Throughout this example, it will be assumed that $N_{ud}$ is limited to 3, although that assumption applies only to this example, and not to the broader principles of the invention. The precise selection of $N_{ud}$ will depend on the implementation.

In this link unstable state 302, after a certain amount of time $T_{ud}$ passes since the last connection attempt (see arrow 324), another connection attempt is made (see block 312). The amount of time between connection attempts if the last connection attempt was unsuccessful $T_{ud}$ may be less than the amount time between connection attempts if the last connection attempt was successful $T_u$, at least if the link up state 301 was experienced more recently than the link down state 303. In the example timelines of FIGS. 4-7, $T_u$ is 60 seconds, and $T_{ud}$ is 30 seconds. If that connection attempt is successful, the process returns (see arrow 325) to the link up state 301. If the connection attempt is not successful, the process returns (see arrow 326) to the link unstable state 302. We now have only two consecutive unsuccessful connection attempts, and thus stay in the link unstable state 302.

After another time $T_{ud}$ passes (see arrow 324) since the last connection attempt, another connection attempt is made (see block 312). If that connection attempt is successful, the process returns (see arrow 325) to link up state 301. If that connection attempt was not successful, however, the process returns (see arrow 326) to link unstable state 302. This time, however, the process has encountered the predetermined number $N_{ud}$ of unsuccessful connection attempts (in our example, three). Therefore, the process transitions (see arrow 327) to link down state 303.

Beginning now in the link down state 303, an Internet connection check (is also performed every certain period of time. The symbol $T_d$ is used in FIG. 3 to represent that period of time for making connection requests if in the link down state 303. In one embodiment, the time $T_d$ is 5 minutes, which will be assumed for this example hereinafter and in the examples of FIG. 4 through 7 in order to provide understanding that concrete numbers help provide. That said, there is no limit to the value of $T_d$, and the optimum value for $T_d$ will depend on preferences and applications. In one embodiment, the value of $T_d$ is greater than $T_u$. Thus, connection attempts are performed less frequently when in a link down state 303 as compared to as a link up state 301. This allows the process to avoid unstable decisions when the link is in a transition process, and also reduces the usage of resources required to make connection attempts when the connection is down.

Once 5 minutes elapses (see arrow 331) a connectivity check is performed (see block 313). If the connection attempt is not successful (arrow 332), the link down state 303 is retained. If, on the other hand, the connection attempt is successful (see arrow 333), the link resumes state 304 is entered. At this point, the number of consecutive successful attempts is just one. If the number of consecutive successful attempts was equal to a certain threshold (referred to as $N_{du}$ in FIG. 3), there would be a transition 337 to the link up state 301. However, since there was only one consecutive successful connection attempt, the process remains at the link resumes state 304. Throughout this example, it will be assumed that $N_{du}$ is limited to three, although that assumption applies only to this example, and not to the broader principles of the invention. The precise selection of $N_{du}$ will depend on the implementation. Note that $N_{du}$ and $N_{ud}$ need not be the same, and may depend on the relative risks of a false positive and a false negative. $N_{du}$ may even be one if a successful connection attempt is compellingly strong or perhaps conclusive evidence of an Internet connection. Nevertheless, the examples of FIGS. 4 through 7 have $N_{du}$ at three for purposes of discussion.

In this link resumes state 304, after a certain amount of time $T_{du}$ passes since the last connection attempt (see arrow 334), another connection attempt is made (see block 314). The amount of time between connection attempts if the last connection attempt was successful $T_{du}$ may be less than the amount time between connection attempts if the last connection attempt was unsuccessful $T_d$, at least if the link down state 303 was experienced more recently than the link up state 301. In the as example timelines of FIGS. 4-7, $T_{du}$ is 1 minute, and $T_d$ is 5 minutes. If that connection attempt is not successful, the process returns (see arrow 335) to the link down state 302. If the connection attempt is successful, the process returns (see arrow 336) to the link resumes state 304. We now have only two consecutive successful connection attempts, and thus stay in the link resumes state 302.

After another time $T_{du}$ passes (see arrow 334) since the last connection attempt, another connection attempt is made (see block 314). If that connection attempt is unsuccessful, the process returns (see arrow 335) to link down state 303. If that connection attempt was successful, however, the process returns (see arrow 336) to link resumes state 304. This time, however, the process has encountered the predetermined number $N_{du}$ of successful connection attempts (in our example, three). Therefore, the process transitions (see arrow 337) to link up state 301.

Figure 4:
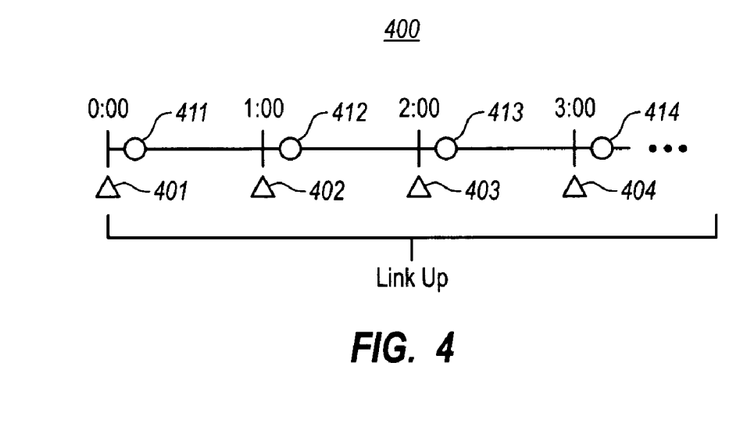
FIG. 4 illustrates a connection attempt timeline that results from a stable link.
Figure 5:
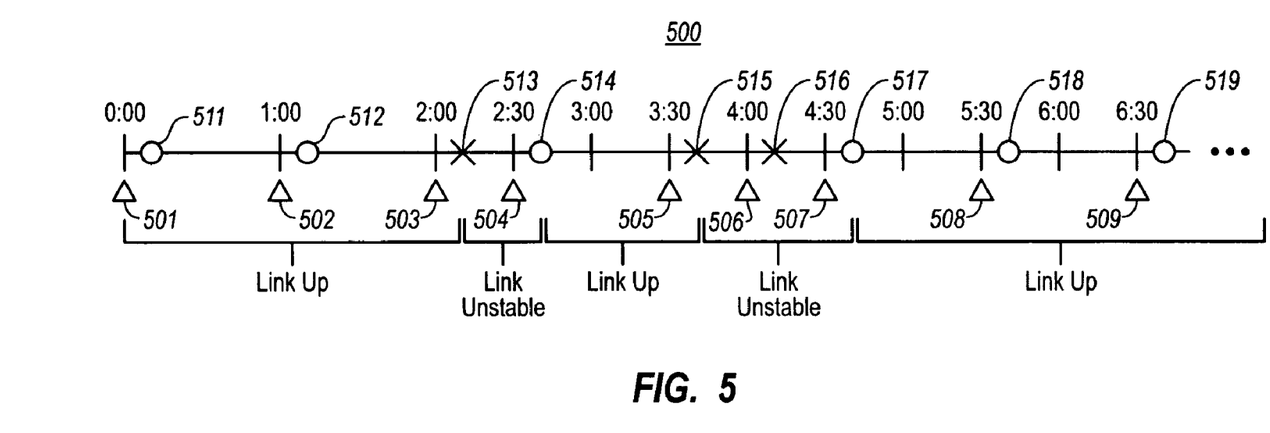
FIG. 5 illustrates a connection attempt timeline that results from an unstable link.
Figure 6:
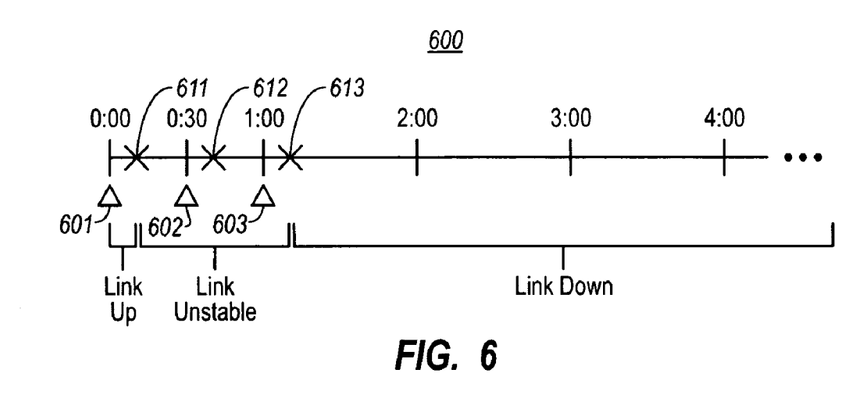
FIG. 6 illustrates a connection attempt timeline that results from a failed link.
Figure 7:
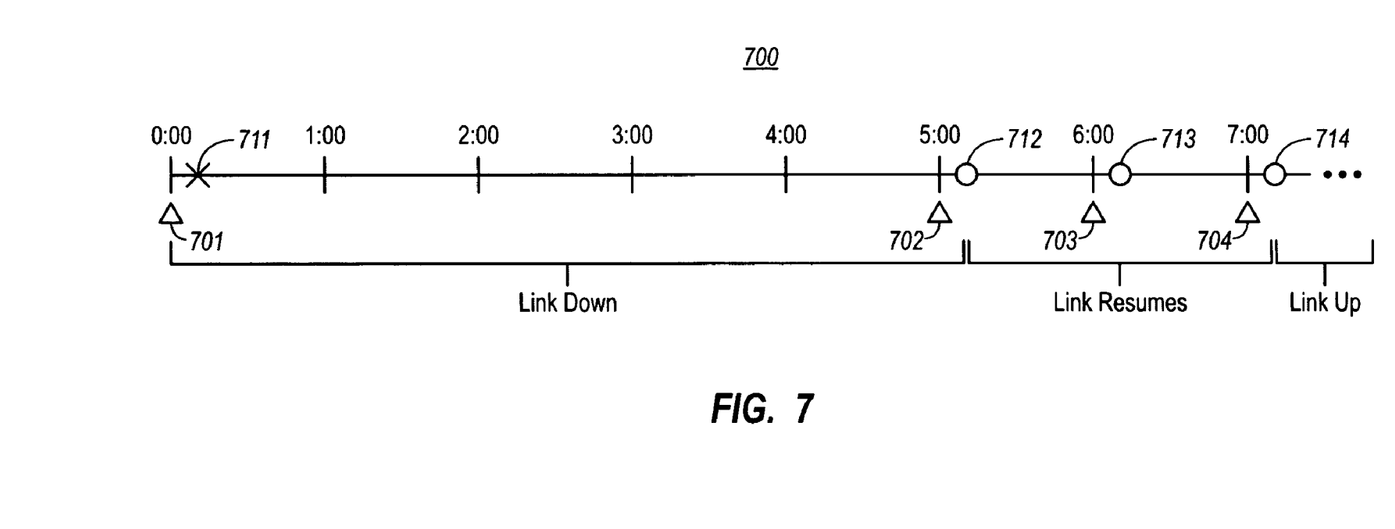
FIG. 7 illustrates a connection attempt timeline that results from a resumed link.

This process will be further clarified with respect to four example timelines that are illustrated and described with respect to FIGS. 4 through 7. FIG. 4 illustrates a connection attempt timeline 400 that results from a stable link. FIG. 5 illustrates a connection attempt timeline 500 that results from an unstable link. FIG. 6 illustrates a connection attempt timeline 600 that results from a failed link. FIG. 7 illustrates a connection attempt timeline 700 that results from a resumed link. Each will now be discussed in turn.

In each case, connection attempts are represented as an upward facing triangle and appear under the timeline at approximately the time the connection attempt is made. A successful connection attempt is represented as a circle that appears on the timeline at approximately the time that it is determined that the connection attempt is successful. An unsuccessful connection attempt is represented as an X that appears on the timeline at approximately the time that it is determined as that the connection attempt was unsuccessful. Whether a success or failure, the result of a particular connection attempt is labeled with a number that is 10 greater than the number used to label the corresponding connection attempt. For instance, successful connection response 411 corresponds to the connection attempt 401, and unsuccessful connection response 513 corresponds to the connection attempt 503, and so forth for the other connection attempts and responses.

FIG. 4 illustrates a connection timeline 400 that results from a stable link. The timeline 400 begins in a link up state. A connection request 401 is made at time 0:00 (read zero minutes, and zero seconds), which is successful as represented by response 411. The process thus remains in the link up state 301. A second connection request 402 is made after 60 seconds, which is again successful as represented by the response 412. The process thus remains in the link up state 301. A third connection request 403 is made after yet another 60 seconds (at the 2 minutes mark), which again is successful as represented by the response 413. Thus, the process remains in the link up state 301. After another 60 seconds, another connection attempt 404 is made. This process may repeat until an unsuccessful connection attempt is encountered.

FIG. 5 illustrates a connection attempt timeline 500 that results from an unstable link. The timeline 500 beings in a link up state. A connection request 501 is made at time 0:00, which is successful as represented by response 511. Thus, the process remains in the link up state 301. A second connection request 502 is made at time 1:00 (read as one minute and zero seconds), which is successful as represented by response 512. Once again, the process remains in the link up state 301. At time 2:00, a third connection request 503 is made, which is not successful as represented by the response 513. Now, the process enters the link unstable state 302, and connection attempts will now be made every 30 seconds, instead of every 60 seconds.

At time 2:30, a fourth connection request 504 is made, which now results in a successful response 514. Accordingly, the process enters a link up state 301, and connection attempts are once again made every 60 seconds.

At time 3:30, a fifth connection request 505 is made, which results in an unsuccessful response 515. Accordingly, the process returns to the link unstable state 302, and connection attempts are once again made every 30 seconds. At time 4:00, a sixth connection request 506 is made, which once again results in an unsuccessful response 516. Accordingly, the process remains in the link unstable state 302. The process does not proceed to the link down state 303, since only two consecutive unsuccessful connection attempts have been encountered, rather than the threshold amount of three. At time 4:30, a seventh connection request 507 is made, which now results in a successful response 517. The process then returns to the link up state 301, and the connection attempts are now made every 60 seconds again.

At time 5:30, an eighth connection request 508 is made, which results in a successful response 518. The process thus remains in the link up state 301. At time 6:30, the final connection request 509 in the example of FIG. 5 is made, which results in a successful response 519. The example of FIG. 5 thus concludes with the process in the link up state 301.

FIG. 6 illustrates a connection attempt timeline 600 that results from a failed link. The timeline begins in the link up state 301. At time 0:00, a first connection request 601 is made, resulting in a failed response 611. The process thus transitions to the link unstable state 302, where connection attempts are made every 30 seconds. At time 0:30, a second connection request 602 is made, again resulting in as a failed response 612. The process remains in the link unstable state 302. There have not yet been a sufficient number of consecutive unsuccessful responses to transition to the link down state 303 at this stage. However, at time 1:00, a third connection request 603 is made, which results in a failed response 613. Now, there have been three consecutive unsuccessful connection attempts, and (since $N_{ud}$ equals three in this example) the process transitions to a link down state 303. In this state, a connection request is made only every 5 minutes in this example. Thus, the next connection request will not occur until time 6:00.

FIG. 7 illustrates a connection attempt timeline 700 that results from a resumed link. The timeline 700 begins in a link down state 303. At time 0:00, a connection request 701 is made, which results in a failed response 711. Accordingly, the process stays in the link down state 303. In this link down state 303, connection requests are made less frequently, and in this example, are made every 5 minutes. Accordingly, at time 5:00, a second connection request 702 is made, resulting in a successful response 712. The process thus transitions to the link resumes state 304. If only one consecutive successful response was all that was needed to resume the link, the process may instead proceed to the link up state 301. However, in this example, three consecutive successful connection attempts should be encountered before transitioning to the link up state 301.

In the link resumes state 304, connection attempts are performed every 1 minute. Accordingly, at time 6:00, another connection attempt 703 is made, which has a successful response 713. Now, two consecutive successful connection attempts have been made, but the process remains in the link resumes state 304. At time 7:00, another connection attempt 704 is made, again resulting in a successful response 714. Now, the predetermined number of successful response have been received, and the as process transitions to the link up state 301 where, coincidentally, connection attempts are also made every 1 minute.

Accordingly, the principles describe herein permit a reliable and adaptive method for verifying Internet connectivity. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer-readable storage device having stored computer-executable instructions that, when executed by one or more processors of a computing system, causes the computing system to perform a method for verifying whether or not the computing system is connected to the Internet, the method comprising:
   an act of identifying a prior Internet connection state based on one or more prior connection attempts;
   an act of periodically making multiple consecutive connection attempts to one or more Internet destinations, wherein a frequency comprising a duration of time for making the multiple consecutive connection attempts is based at least in part on the identified prior Internet connection state, and such that making each of the multiple consecutive connection attempts more or less frequently is dependent upon the identified prior Internet connection state;
   an act of determining connection attempt results by, for at least a plurality of the multiple consecutive connection attempts, an act of determining whether the corresponding connective attempt resulted in success or failure; and
   an act of determining whether or not Internet connectivity is present using the connection attempt results, from the plurality of the multiple consecutive connection attempts, rather than relying solely on any single connection attempt result.

2. The one or more computer-readable storage device in accordance with claim 1, wherein the one or more computer-readable storage device comprises system memory.

3. The one or more computer-readable storage device in accordance with claim 2, wherein the one or more Internet destinations comprises a single Internet destination such that the act of periodically making multiple consecutive connection attempts to one or more Internet destinations comprises:
   an act of periodically making multiple consecutive connection attempts to the single Internet destination.

4. The one or more computer-readable storage device in accordance with claim 2, wherein the one or more Internet destinations comprises a plurality of Internet destination such that the act of periodically making multiple consecutive connection attempts to one or more Internet destinations comprises:
   an act of periodically making multiple consecutive connection attempts to Internet destinations, wherein for at least some of the multiple consecutive connection attempts, the connection attempt is to a different Internet destination as compared to another connection attempt of the multiple consecutive connection attempts.

5. The one or more computer-readable storage device in accordance with claim 4, wherein the plurality of multiple consecutive connection attempts is a plurality of consecutive connection attempts, wherein each of the plurality of consecutive connection attempts is to a root Domain Name Server (DNS) server.

6. The one or more computer-readable storage device in accordance with claim 5, wherein each of the plurality of consecutive connection attempts is to a different root DNS server.

7. The one or more computer-readable storage device in accordance with claim 2, wherein the one or more Internet destination includes at least one root DNS server.

8. The one or more computer-readable storage device in accordance with claim 2, wherein the one or more Internet destinations includes at least one enterprise server.

9. A computer-readable storage medium in accordance with claim 1, wherein the act of periodically making multiple consecutive connection attempts to one or more Internet destinations comprises:
   an act of performing connection attempts more frequently in response to detecting that the prior Internet connection state is a connected state.

10. A method implemented by a computing system having a processor for verifying whether or not the computing system is connected to the Internet, the method comprising:
   an act of identifying a prior Internet connection state based on one or more prior connection attempts;
   an act of making multiple connection attempts to one or more Internet destinations, wherein a frequency for making the multiple consecutive connection attempts is based at least in part on the identified prior Internet connection state, and such that making each of the multiple consecutive connection attempts more or less frequently is dependent upon the identified prior Internet connection state;
   an act of determining connection attempt results by, for at least a plurality of the multiple consecutive connection attempts, an act of determining whether the corresponding connective attempt resulted in success or failure; and
   an act of determining whether or not Internet connectivity is present, from the plurality of the multiple consecutive connection attempts, rather than using solely one connection attempt result of the connection attempt results.

11. A method in accordance with claim 10, wherein the act of making multiple connection attempts comprises:
an act of determining that a current Internet connection state is connected, wherein the connection attempts are made more frequency due to the current Internet connection state being connected than they would be if the current Internet connection is disconnected.

12. A method in accordance with claim 10, the method further comprises:
an act of identifying a prior Internet connection state, wherein there are at least four possible states for an Internet connection state including the following:
  a link up state which means an Internet connection is determined as being present and there have been no unsuccessful connection attempts in a first predetermined number of prior connection attempts;
  a link down state which means an Internet connection is determined as not being present and there have been no successful connection attempts in a second predetermined number of prior connection attempts;
  a link unstable state which means an Internet connection is still assumed to be present, but that there has been at least one unsuccessful connection attempt in the first predetermined number of prior connection attempts although there have not yet been enough unsuccessful connection attempts to achieve the link down state; and
  a link resumes state which means an Internet connection is still assumed to not be present, but that there has been at least one successful connection attempt in the second predetermined number of prior connection attempts although there have not yet been enough successful connection attempts to achieve the link up state.

13. A method in accordance with claim 12, wherein the first predetermined number and the second predetermined number are the same.

14. A method in accordance with claim 12, wherein the first predetermined number is three.

15. A method in accordance with claim 12, wherein the act of making multiple connection attempts to one or more Internet destinations occurs more frequently if the prior Internet connection state is link up state as compared to the prior Internet connection state being link down state.

16. A method in accordance with claim 12, wherein the act of making multiple connection attempts to one or more Internet destinations occurs more frequently if the prior Internet connection state is link unstable state as compared to the prior Internet connection state being link up state.

17. A method in accordance with claim 12, wherein the act of making multiple connection attempts to one or more Internet destinations occurs more frequently if the prior Internet connection state is link resumes state as compared to the prior Internet connection state being link down state.

18. A method program product in accordance with claim 10, wherein the one or more Internet destination includes at least one root DNS server.

19. The method recited in claim 1, wherein said plurality of multiple consecutive connection attempts comprise at least three consecutive connection attempts.

20. A method for verifying whether or not a computing system is connected to the Internet, the method comprising:
an act of identifying a prior Internet connection state, wherein there are at least four possible states for an Internet connection state including the following:
  a link up state which means an Internet connection is determined as being present and there have been no unsuccessful connection attempts in a first predetermined number of prior connection attempts;
  a link down state which means an Internet connection is determined as not being present and there have been no successful connection attempts in a second predetermined number of prior connection attempts;
  a link unstable state which means an Internet connection is still assumed to be present, but that there has been at least one unsuccessful connection attempt in the first predetermined number of prior connection attempts although there have not yet been enough unsuccessful connection attempts to achieve the link down state; and
  a link resumes state which means an Internet connection is still assumed to not be present, but that there has been at least one successful connection attempt in the second predetermined number of prior connection attempts although there have not yet been enough successful connection attempts to achieve the link up state;
an act of making multiple connection attempts to one or more Internet destinations;
an act of determining connection attempt results by, for at least a plurality of the multiple consecutive connection attempts, an act of determining whether the corresponding connective attempt resulted in success or failure; and
an act of determining whether or not Internet connectivity is present using more than just one connection attempt result of the connection attempt results.

21. One or more computer-readable storage device having thereon computer-executable instructions that, when executed by one or more processors of a computing system, causes the computing system to perform a method for verifying whether or not the computing system is connected to the Internet, the method comprising:
an act of identifying a prior Internet connection state, wherein there are at least two possible states for an Internet connection state including the following:
  a link up state which means an Internet connection is determined as being present and there have been no unsuccessful connection attempts in a first predetermined number of prior connection attempts; and
  a link down state which means an Internet connection is determined as not being present and there have been no successful connection attempts in a second predetermined number of prior connection attempts;
an act of making multiple consecutive connection attempts to varying Domain Name Server (DNS) servers, wherein the act of making multiple connection attempts to one or more Internet destinations occurs more frequently if the prior Internet connection state is link up state as compared to the prior Internet connection state being link down state;
an act of determining connection attempt results by, for at least a plurality of the multiple consecutive connection attempts, an act of determining whether the corresponding connective attempt resulted in success or failure; and
an act of determining whether or not Internet connectivity is present using the connection attempt results, rather than relying on any single connection attempt result.

* * * * *